United States Patent [19]
Gordon et al.

[11] Patent Number: 5,920,700
[45] Date of Patent: *Jul. 6, 1999

[54] SYSTEM FOR MANAGING THE ADDITION/ DELETION OF MEDIA ASSETS WITHIN A NETWORK BASED ON USAGE AND MEDIA ASSET METADATA

[75] Inventors: Yvette Gordon, Orlando; James P. Ludington, Longwood, both of Fla.

[73] Assignee: Time Warner Cable, Stamford, Conn.

[*] Notice: This patent issued on a continued prosecution application filed under 37 CFR 1.53(d), and is subject to the twenty year patent term provisions of 35 U.S.C. 154(a)(2).

[21] Appl. No.: 08/706,676

[22] Filed: Sep. 6, 1996

[51] Int. Cl.⁶ .................................................. G06F 15/16
[52] U.S. Cl. ........................................ 395/200.56; 348/7
[58] Field of Search .................. 395/200.53–200.56; 348/7

[56] References Cited

U.S. PATENT DOCUMENTS

| | | | |
|---|---|---|---|
| Re. 35,651 | 11/1997 | Bradley et al. ............................. | 348/7 |
| 5,220,420 | 6/1993 | Hoarty et al. ............................. | 348/12 |
| 5,361,091 | 11/1994 | Hoarty et al. ............................. | 348/7 |
| 5,412,720 | 5/1995 | Hoarty ........................................ | 380/15 |
| 5,442,771 | 8/1995 | Filepp et al. ........................ | 395/200.56 |
| 5,557,317 | 9/1996 | Nishio et al. ................................ | 348/7 |
| 5,568,180 | 10/1996 | Okamoto .................................... | 348/7 |
| 5,586,264 | 12/1996 | Belknap et al. .................... | 395/200.49 |
| 5,630,067 | 5/1997 | Kindell et al. ........................... | 395/872 |
| 5,689,299 | 11/1997 | Isono et al. ................................ | 348/7 |
| 5,748,898 | 5/1998 | Ueda .................................. | 395/200.49 |
| 5,748,956 | 5/1998 | Lafer et al. ............................. | 707/104 |
| 5,790,935 | 8/1998 | Payton ..................................... | 455/5.1 |

*Primary Examiner*—Richard L. Ellis
*Attorney, Agent, or Firm*—John R. Wahl; Robert G. Crouch; Holland & Hart LLP

[57] ABSTRACT

An intelligent asset management system is disclosed which includes a schedule manager for evaluation of predetermined events particular to each asset and predetermined requirements for distribution, updating, and deletion of the asset in view of real time current conditions and constraints; a resource manager for optimizing the utilization of hard disk storage devices on the system as well as optimizing the use of other types of storage devices available; a configuration manager that tracks and provided updated asset Metadata, application information, storage disk topology, bandwidth topology, weighting factors, and timing information for each asset; and a reporting and polling manager which tracks actual activity on the system such as user input and demands, and provides periodic reporting capabilities for the operators of the system.

13 Claims, 5 Drawing Sheets

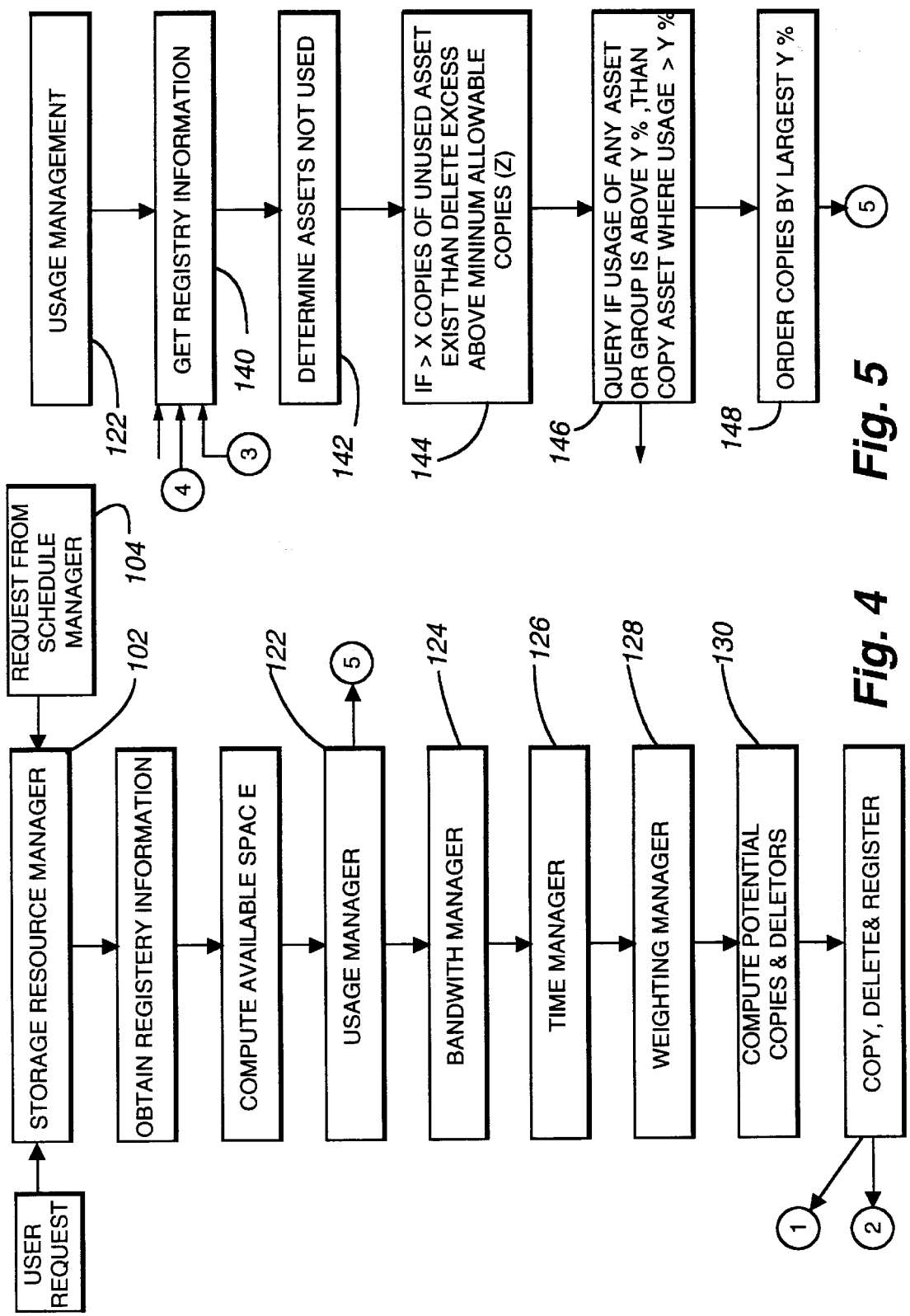

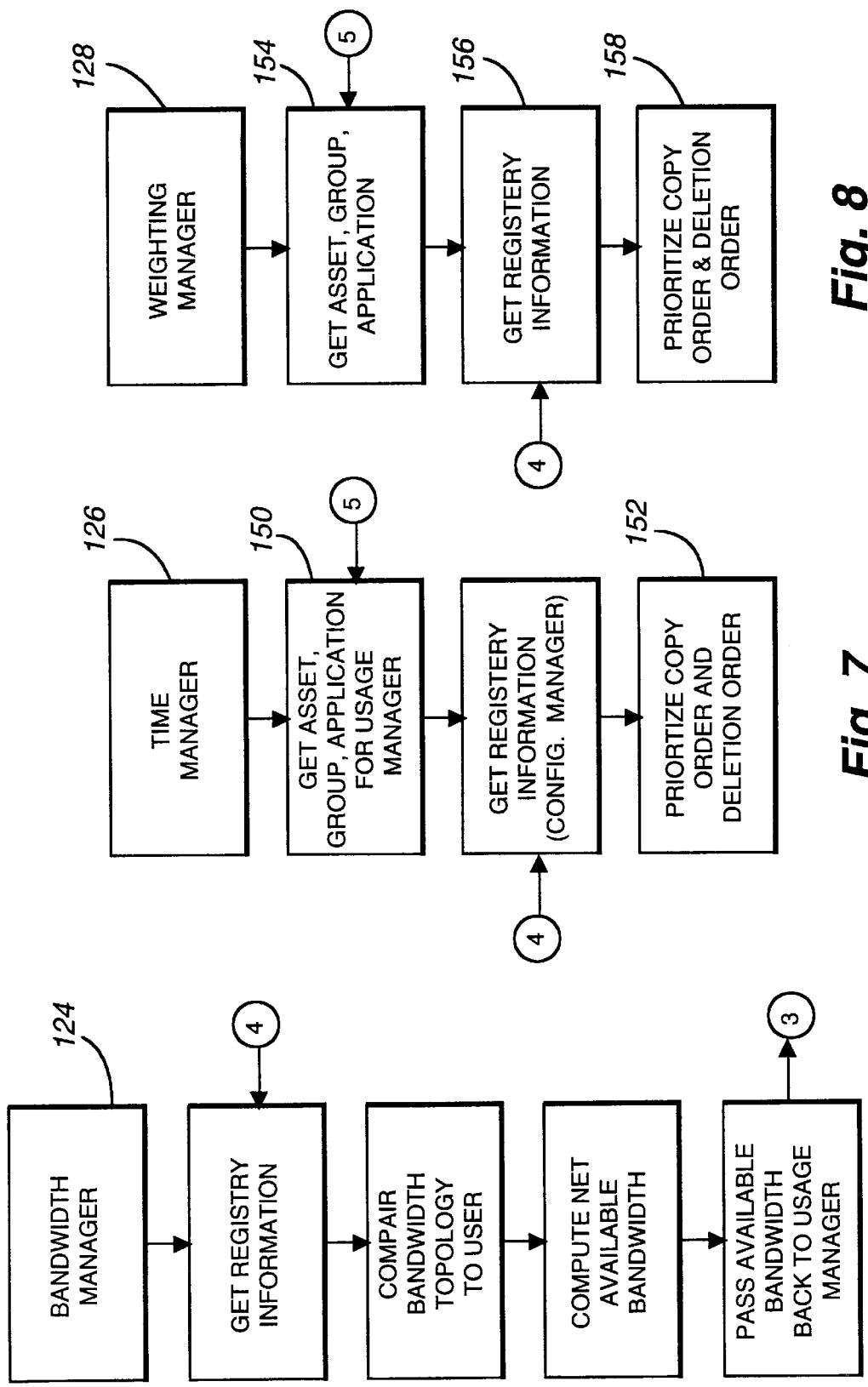

SYSTEM FOR MANAGING THE ADDITION/ DELETION OF MEDIA ASSETS WITHIN A NETWORK BASED ON USAGE AND MEDIA ASSET METADATA

BACKGROUND OF THE INVENTION

1. Field of the Invention

The present invention relates to a software control system for distribution management of media assets and more particularly to an automated system for management of media news and entertainment assets.

2. Description of the Related Art

Digital assets include a variety of different types of content. The following are examples of the types of assets within the scope of multimedia assets.

Video files—either raw or compressed

Audio files—either raw or compressed

Font files—Digitally coded typesets for television receiver display

Configuration files—For operations or Applications

Image files—Compressed or TIFF, RGB, etc. digital pictures

Applications—downloadable computer programs

Currently almost all commercial entertainment related products such as movies, news videos, audio news, and music, etc. are distributed to the public via hard copy, cable and the air waves in a one way fashion. That is, there is no way of providing end user input to the system or to the provider, and the provider can only monitor assets purchased or used after the sale or access has taken place. In addition, distribution of entertainment information today is serial and mostly analog. In addition, most cable and/or satellite transmission and usage is and has been real time. The information is used, i.e., heard or displayed, as it is received.

One recent development that is receiving increased attention is interactive television (ITV). ITV is currently very basic. It is, for the most part, still serial and real time. For example, most systems allows a cable subscriber to transmit a request via cable for access to a previously scheduled cable program. There are only limited capabilities, however, for the end user to select, view and/or hear, at his or her option, a particular asset at any given time as desired by the end user. Examples of interactive cable systems are disclosed in U.S. Pat. Nos. 5,361,091 and 5,412,720.

There presently are only very limited systems for managing the transmission of such entertainment information, called asset management systems. The concept of asset management requires a basic knowledge of how such an asset is created and distributed. Take a movie as one example. The movie is created on film or videotape on a set or on location. The raw footage is then dubbed and edited at a studio on film or tape. The movie is then finalized at a production facility where trailers, audio and video shorts or out-takes are separately generated, and promotional materials are designed and produced. The movie audio and video tape is then duplicated for distribution.

As presently envisioned by the entertainment distribution industry, for ITV, the asset "atoms" e.g., a movie video and audio are digitized and packaged into digital distribution files. The movie file is then preferably compressed, for example, using MPEG-2 compression. The asset, now a compressed file, is then stored on an archival storage device such as digital tape or a hard disk drive. The asset can then be copied and transferred to one or more servers at distribution hubs or nodes of a cable network for further storage, copying and use by other servers or use by end users who access the asset through the server via a transmission system such as a cable as a subscriber to the cable transmission service.

A supplier of entertainment assets such as video files and audio files, must be able to distribute these assets to final distribution points efficiently so that the end users can access them as desired. This means that the asset management system must be able to distribute the asset over multiple paths to multiple locations in a short period of time. At present, video on demand (VOD) is not widely available (or, it is not really video on demand). There are a number of constraining factors, such as the transfer time to place the asset where it can be accessed by the end user, the transfer rate at which the asset can be transmitted, and the number of simultaneous users on the system, etc. A major limitation of current distribution systems, for example, is that the number of simultaneous transmissions via cable is constrained by the available bandwidth of the cable system. Even if the provider can provide sufficient number of copies, there may not be enough bandwidth available to the destination to timely transmit the number of files required at a given time. The end user then becomes dissatisfied, having to wait for receipt of his movie. Therefore there is a need for a system which will automatically optimize such transmission variables so that the end user gains access whenever desired.

Another limitation which must be considered is the availability of asset storage space at any given location. Where do you place this information or asset so you're assured of having the highest probability of not getting blocked, i.e. not having a user get blocked from access because there are too may other people accessing that information. Asset storage distribution also has its own limitation which must be considered. That is, each hard disk drive or other storage device such as tape or RAM is connected to the outside world by some interface device such as a SCSI interface. This SCSI interface has a throughput limitation., i.e. only so much data can be passed through it at a given time. Thus the SCSI can be viewed as a pipe between storage devices which has a limiting maximum flow rate.

A typical interactive TV system 1, as conventionally envisioned, is shown in schematic block diagram form in FIG. 1. The system 1 consists of one or more computer servers 2 each connected to a storage device 3. The assets stored on the storage device 3 are then distributed to the end user television sets 4 via a cable distribution system. Thus you have a number of computer servers controlling access to movies or news or shopping or other applications. The movie or news files are stored on the hard disk storage devices 3. Today, we can take a tape file from a Wide Area Network (WAN) or Local Area Network (LAN) 5 and store it on the storage device 3 through the servers 2.

A conventional asset management system takes this asset, for example, a movie file consisting of audio and video, and places it on the head end or hub server storage device so that the end user can access it. The operator of the system manually controls, through the server, where and when the asset is utilized by the end user. It is very one movie specific, i.e., one movie at a time.

When a popular asset is launched to the system, many end users will attempt to access the asset at the same time. The management system may easily get bogged down and fail to provide the asset to the end users on demand. Further, there is no way with current systems to predict in real time when peak usage should occur and anticipate these problems and surges so that the system can compensate for such surges as a matter of course.

There is currently no asset management system which permits multiple person access, tracks user access, predicts user access based on past and real time user history, tracks and manages asset distribution, tracks and manages asset storage, tracks and manages storage availability, tracks and manages scheduling of asset distribution in accordance with predetermined criteria such as licensing constraints and marketing limitations. Further, there currently is no system available which manages and controls globally all digital assets such as video, audio, multimedia, Internet services, and downloadable computer application assets.

SUMMARY OF THE INVENTION

The present invention provides a solution to the above described deficiencies in digital entertainment and communication asset management systems and its application encompasses all digitally stored information or assets.

An effective interactive television operation has the need for an asset distribution system. This system has several pieces:

Point-to-Point Multipath—A single data warehouse location can be the distribution point for several other locations. For example, a location in Orlando, Fla. may simultaneously stream assets to locations in New York, Denver, Chicago, and Los Angeles. Network methods used for distribution may vary and include existing technologies; however, the automated distribution and management of this distribution is the subject of this patent application. There are several areas that can drive automated asset distribution:

Schedules for placement of assets on servers.

Asset utilization information of assets or content.

Transportation of assets from network to network (or hub).

Note: Automated asset distribution also includes movement of assets from archive location to faster access locations; i.e., a central warehouse to RAM-based hubs, or from server-to-server.

The present invention advantageously utilizes a wide area network of interconnected distribution nodes or sites which each, in turn, may also serve a plurality of WANs or LANs to interactively distribute and manage assets at each of multiple nodes so as to optimize availability of assets to the end user. To accomplish this optimization, the overall management system in accordance with the present invention provides for interactive feedback from the users; tracking of asset characteristic information, tracking of asset location, number of copies of an asset available and permitted, location of each copy, capacity of each storage device on the system, availability of bandwidth for asset transfer between nodes and between each other two points of the system, and, at each step, provides traffic control to optimize all resource utilization to optimize asset availability to the end user.

This intelligent asset management system in accordance with the invention includes a schedule manager for evaluation of predetermined events particular to each asset and predetermined requirements for distribution, updating, and deletion of the asset in view of real time current conditions and constraints; a resource manager for optimizing the utilization of hard disk storage devices on the system as well as optimizing the use of other types of storage devices available; a configuration manager that tracks and provides updated asset Metadata, application information, storage disk topology, bandwidth topology, weighting factors, and timing information for each asset; and a reporting and polling manager which tracks actual activity on the system such as user input and demands, and provides periodic reporting capabilities for the operators of the system.

Those having normal skill in the art will recognize the foregoing and other objects, features, advantages and applications of the present invention from the following more detailed description of the preferred embodiment is illustrated in the accompanying drawings.

BRIEF DESCRIPTION OF THE DRAWINGS

FIG. 4 is a block diagram of the resource manager in accordance with the present invention.

FIG. 5 is a block diagram of the usage manager in accordance with the present invention.

FIG. 6 is a block diagram of the bandwidth manager in accordance with the present invention.

FIG. 7 is a block diagram of the time manager in accordance with the present invention.

FIG. 8 is a block diagram of the weighting manager in accordance with the present invention.

DETAILED DESCRIPTION OF THE PREFERRED EMBODIMENT

The following paragraphs describe an exemplary embodiment of the present invention. Like numerals are utilized wherever possible to identify like components or blocks to simplify the description of the various subcomponents described herein. It is to be understood that various changes, modifications, and alterations may be made without departing from the scope of the invention as defined by the appended claims.

Figure 1:
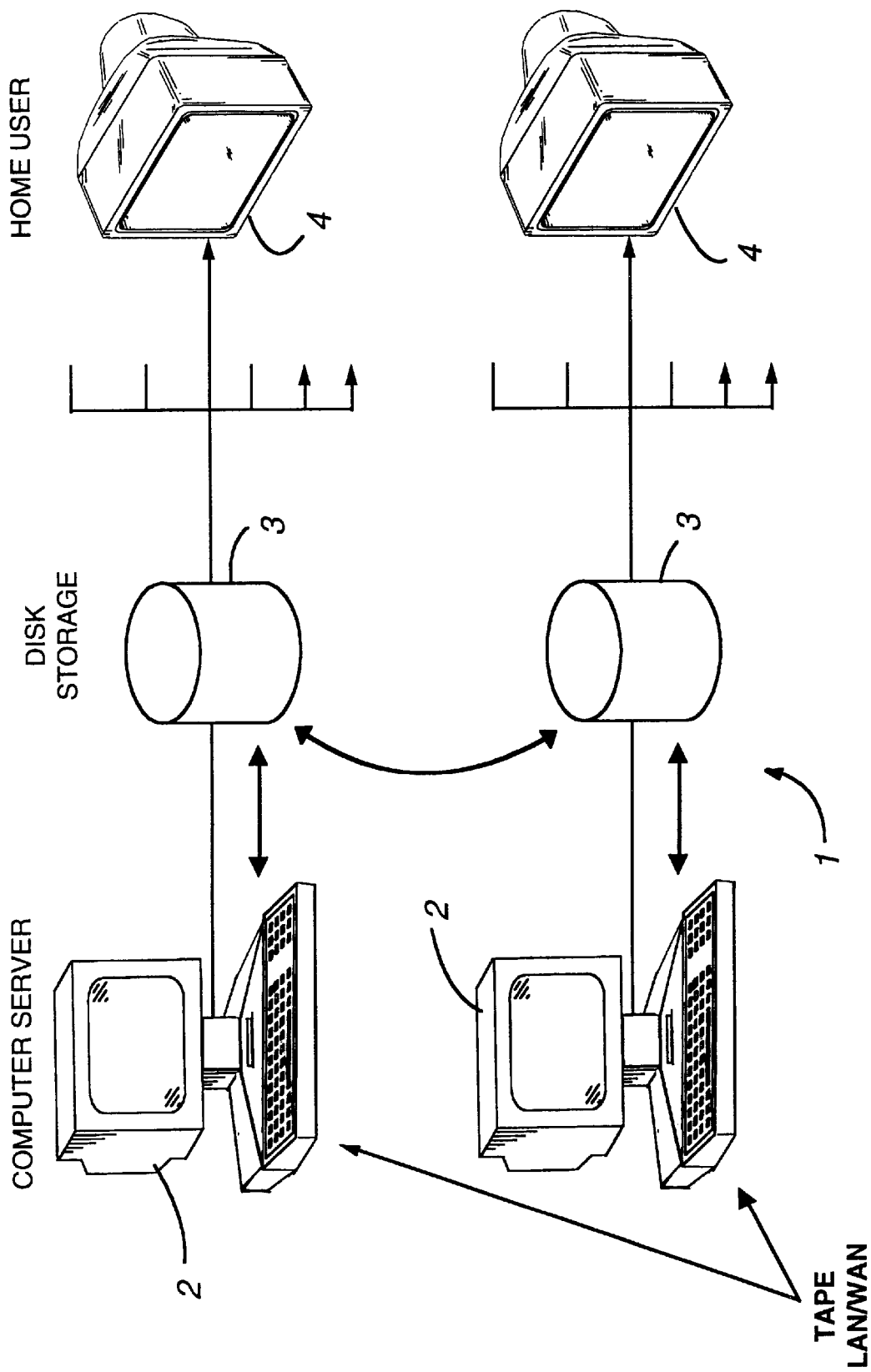
FIG. 1 is a schematic of a conventional television asset distribution system.
Figure 2:
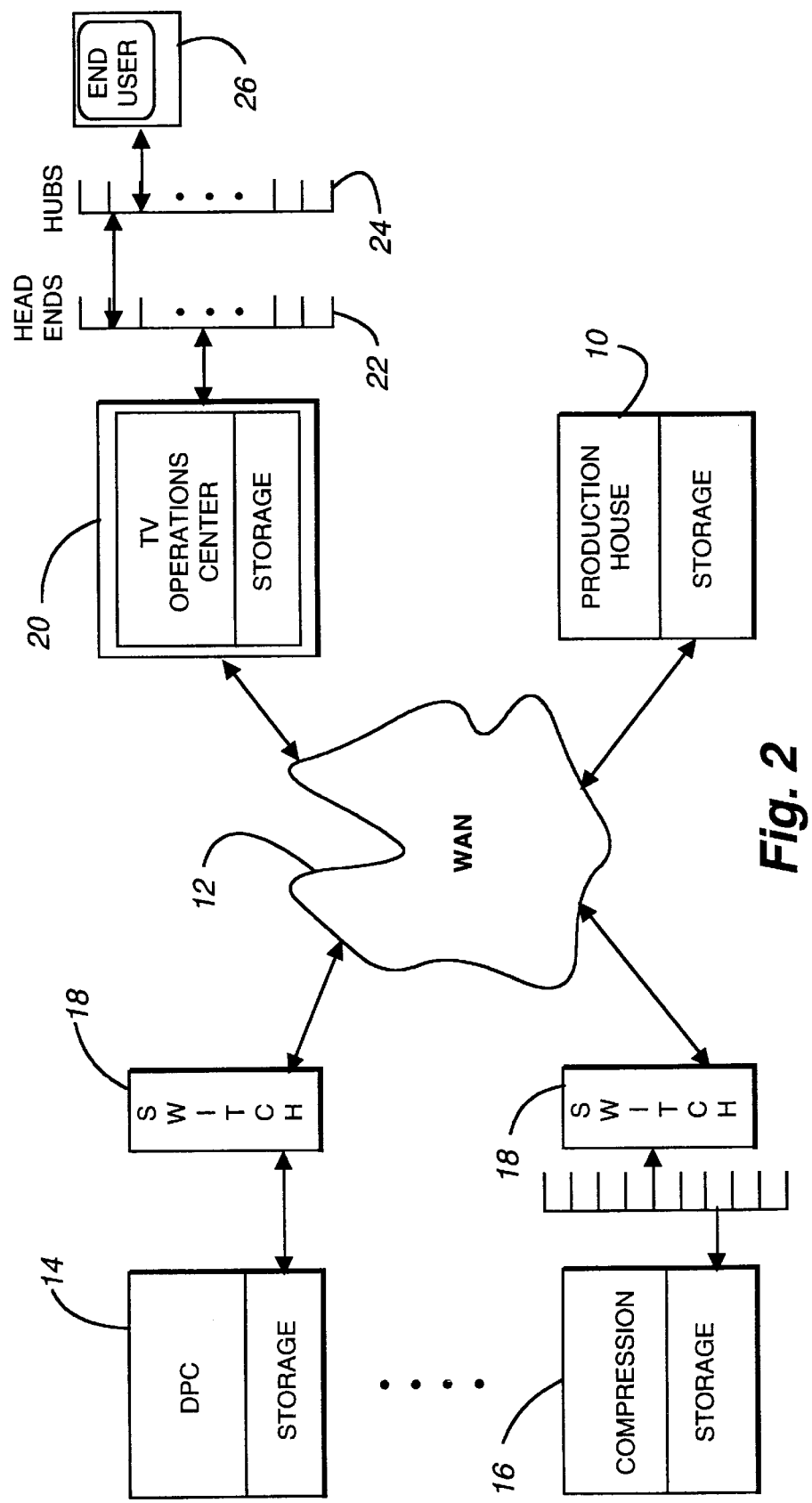
FIG. 2 is a schematic of an interactive digital television system utilizing an intelligent asset management system in accordance with the present invention.

Turning now to FIG. 2, a schematic of an overall interactive television system is shown. Assets are preferably produced at a production house 10, digitized, and transmitted to a wide area network 12. Similarly, an asset such as a movie may be provided to a digital production center (DPC) 14 for digitization and then transferred to a compression facility 16, where the digital file is compressed using MPEG-2 compression, for example. The asset is then transmitted via a switch 18 into the WAN 12 for further distribution to one or more ITV operation centers 20.

The operation center 20 in turn manages the further distribution of the asset to various network hubs 24 and head ends 22, then finally to the end user 26. As indicated in FIG. 2, there are a number of operations centers connected to the WAN. Each of the operations centers communicates with the other operation centers through the WAN or a LAN system. The operations center is the focal point of the asset management system in accordance with the present invention. The operations center 20 is staffed 24 hours a day and provides the overall oversight and control of the management system as will be subsequently described.

Figure 3:
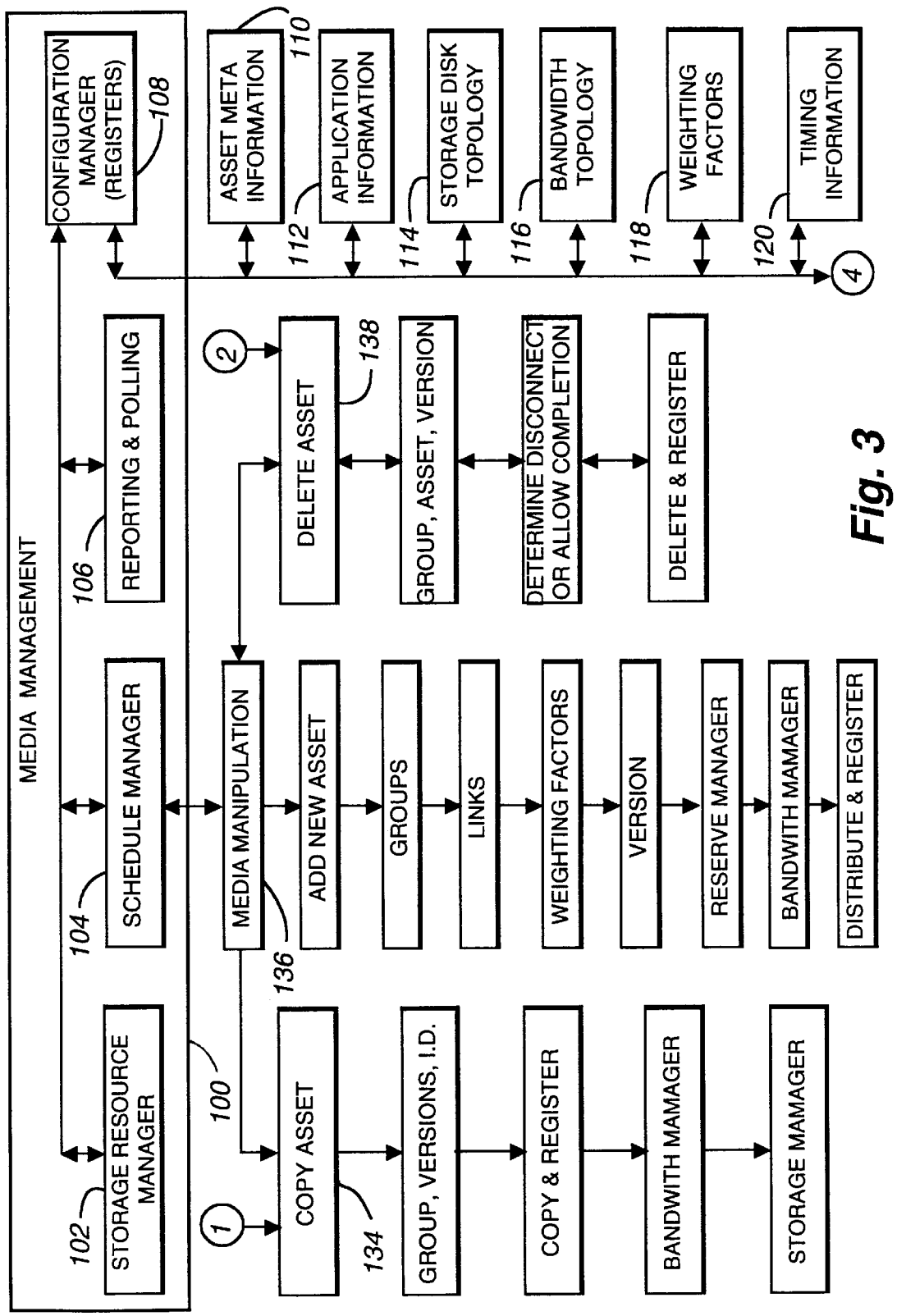
FIG. 3 is a block diagram of the overall asset management system in accordance with the present invention which is utilized at the ITV Operations Center shown in FIG. 2.

An intelligent asset management system 100 in accordance with the present invention is shown in an overall block diagram in FIG. 3. The asset management system 100 dynamically manages assets, i.e. it accepts and schedules utilization of new assets, distributes new assets, stores assets during the asset's useful life, optimizes placement of assets and dynamically optimizes asset availability to end users in response to resource availability, user demand, and evaluation of trends.

The asset management system 100 comprises four basic managers integrated together. These are a storage resource manager 102, a schedule manager 104, a reporting and polling manager 106, and a configuration manager 108. Each of these managers and the managers within each of these basic or primary managers are integrated and interconnected with and have access to the other managers. The connection lines for all of the managers are not shown in the Figures as illustration of all interconnections would render the Figures unintelligible. Consequently, only the major information flow paths are shown and it should be understood that an event at one manager block will be immediately distributed to the other manager blocks and registries.

The configuration manager 108 includes a number of relational databases or registers integrated together which maintains information concerning each individual asset and each distribution system component. These registers include: an asset metadata registry 110; an asset application information registry 112; a storage component topology registry 114; a bandwidth topology register 116; a weighting factor registry 118; and a timing registry 120. Each of these registries is called, queried and utilized by the various managers in handling an asset.

The resource manager 102 is a primary traffic manager in the asset management system 100 in accordance with the present invention. The resource manager 102 continually queries the storage component topology registry 114, the bandwidth topology registry 116 and the configuration manager 108 in order to maintain an up to date working status of each and every asset and available storage location and transmission pathway. The resource manager also receives requests from end users, queries from the schedule manager 104, other operation centers, and calls via the WAN or LAN from the various production houses 10, DPCs 14 or compression facilities 16. The resource manager 102 optimally routes and times the transfer of digital assets from one location to another and optimally controls storage space utilization, whether it be local at the operations center 20, or at the hubs 22, head end servers 24, compression storage facilities 12 or elsewhere.

Referring now to FIG. 4, the resource manager 102 receives requests from the schedule manager 104 (FIG. 3) and provides input to the reporting and polling manager 106 (FIG. 3). The resource manager 102 in operation 119 obtains disk topology information from the storage topology register 114 to determine what potential space exists. Operation 121 then computes the available storage space on each device. The resource manager 102 receives a request, for example, from a user or a manager to transfer an asset. The resource manager 102 at operation 122 also continually queries a usage manager block 122 to determine the population of unused or overused assets in accordance with previously determined limits, and queries the bandwidth manager in operation 124 to determine the traffic density and available traffic capacity on each transmission line or cable in the overall system. The resource manager then queries and receives input from a time manager in operation 126 and a weighting management in operation 128. In response to the input, operation 130 then determines whether to potentially copy an asset to a particular location or delete an asset from a particular storage device. Operation 131 sends the copy, delete and register information to schedule manager 104 in FIG. 3.

The schedule manager 104 tracks and implements predetermined asset distribution requirements and implements actual media manipulation directions. These directions may include copying of the asset, addition of a new asset to the system, or deletion of an asset. The schedule manager 104 also queries the asset metadata register 110 and tallies calls from the other managers to maintain a number of event lists for actions involving the assets.

A block diagram of the schedule manager 104 is shown in FIG. 3. The schedule manager continually queries the configuration manager 108 to obtain asset metadata from block 110 and application information from block 112 in order to determine what assets need to be transferred at what time and how many copies are authorized. The schedule manager 104 similarly receives information from the usage manager 122 through the resource manager shown in FIG. 4 in order to schedule copying and deletion orders in accordance with end user demand or lack of demand in order to continually optimize storage availability and utilization.

The schedule manager 104 feeds a media manipulation module 132 which includes a copy asset block 134, an add asset block 136, and a delete asset block 138. These three blocks or modules actually perform the copying, deletion or addition of new asset actions. Thus when the resource manager 102 determines, in block 130, that the asset should be deleted, this information is sent to the delete asset block 138 in the schedule manager 104. If the resource manager 102 determines that the asset should be copied, this information is sent to the copy asset block 134A. Operations 134 and 138A then call the configuration manager 108 to obtain the asset's ID information details such as group and version. Operation 134B copies the asset and assigns and registers a new unique ID to the new copy. Operations 134C and 134D query the bandwidth manager and resource manager 102 to transmit the new copy to its appropriate location. At the same time, the disk topology register 114 is updated to reflect the new copy and its location. Similarly, the operation 138B obtains asset metadata information from the asset metadata information registry 110 and the application information register 112. Then, operation 138B determines whether there are any preexisting links to this asset which remain in use. If no remaining links are outstanding, the asset is deleted and all registries are updated accordingly by operation 138C.

The schedule manager 104 also queries the asset metadata information registry 110 to maintain a running cue of assets to be copied and distributed or deleted due to predetermined release date instructions, license expirations, etc. In the case of a new asset to be distributed, the schedule manager 104 obtains the date and time information from the configuration manager and in operations 136A, 136B, 136C, and 136D reads new asset information including groups, links, weighting factors and version. Then operation 136E queues the asset for copying and distribution. When it is time for the asset to be copied and distributed to the network system, operation 136F sends the request through the resource manager 102 which in turn queries each of the blocks 122, 124, 126, 128 and 130 in FIG. 4 and then operation 131 sends the appropriate command to the copy asset block 134 for implementation and registration.

In the case of an asset deletion request from the configuration manager 108 the schedule manager 104 or the usage manager 122, the delete asset block 138 in operation 138A again obtains asset metadata information from the asset metadata information registry 110 and the application information register 112. Operation 138B then determines whether there are any preexisting links to this asset which remain in use. If no remaining links are outstanding, the asset is deleted and all registries are updated accordingly by operation 138C.

The Application information register 112 is a database which provides a registry of all assets related to a particular application and vice versa. In other words, this register tracks the links between one asset and any other asset or sets of assets and applications which use the asset. For example, a movie trailer video may be utilized by an online shopping service (used to cross-advertise), a promotional service (used to provide discounts on selected movies), Video on Demand (used to preview the movie), games (used as background video to a game), and/or as a news file. When the scheduling manager 104 processes a file deletion request, such as, one from the usage manager 122, the application registry 112 is queried whether the asset is still being used by any other application. If not, or if the expiration date and time is concurrent, then a permissive flag or other signal is provided and the deletion request proceeds through the media manipulation block130 to the delete asset block 138.

The resource manager 102 draws on input from a number of managers which serve other managers as well. The bandwidth manager 124, the time manager 126, and the weighting manager 128 all provide input to the resource manager 102 and the scheduling manager 104. The bandwidth manager 124 queries the bandwidth topology register 116 and queries the usage manager 122 to determine the net available bandwidth for each pathway and continually updates the media manipulation module 132 in the schedule manager 104 and the usage manager accordingly.

Referring to FIG. 7, in operation 150 the time manager 126 receives a call or output from the operation 148 (FIG. 5) in the usage manager module 122. Operation 151 queries the timing information registry 120 and the asset meta information registry 110 to retrieve type of file information. Then, in operation 152, the copy and deletion order is prioritized. For example, the timing registry 120 may indicate that it is 6:30PM and knows that news files take priority over movies between 6:00PM and 7:30PM. The asset registry 110 of the configuration manager 108 indicates to the time manager 126 that the asset of interest is a movie file. Therefore the time manager would then assign a low priority flag in block 152 to the asset from the usage management module 122 and then pass the asset to the schedule manager 104 for queuing for either copying or deletion in accordance with the priority flag.

The reporting and polling manager 106 continually monitors traffic to and from end users, between the control centers, and between the various managers of the asset management system and automatically generates reports for trend reports and monitoring of system operation by the staff at the operations center 20. In addition, the reporting and polling manager 106 continually monitors traffic between hubs 22 and head ends 24 and transmits reporting data to other operations centers 20.

The operations center 20 is the place where the reporting and polling manager provides its primary output in the form of reports, trend analysis, etc. so that the operators can change weighting factors and other parameters in response to long term trends and late breaking events in order to anticipate viewer demand and compensate for the unexpected. For example, the asset management system of the invention might automatically assign priority of movies and music to the distribution system between the hours of 8:00PM and 10:00PM over news assets. However, the occurrence of a massive earthquake in California could make news assets more important and in higher demand by the users during this time slot for a short period of days following the event. Therefore the operations center personnel can modify the priorities assigned to news assets and movies during that time. Alternatively, the reporting manager may indicate that user demand is trending for other types of assets during these hours in different portions of the system and therefore priority shifts in different areas of the network served by the operations center may be appropriate In order to provide a most effective model for interactive television monitoring of content and network traffic, it is desirable but not cost feasible to hire a large staff at each head end. Alternatively the operations center 20 is the place from which the algorithms in the asset management system in accordance with the preferred embodiment of the invention are preferably fine tuned in response to real time events and trends. The asset management system in accordance with the preferred embodiment maximizes the automated monitoring and optimizes digital content adjustment of traffic on the distribution system as well as minimizing the staffing required while permitting efficient staff monitoring from one or more of the operations centers.

Referring now back to the configuration manager 108, the asset metadata register 110 is a database containing all of the asset specific information, such as its serial number, type of asset, release date, version, source ID, license termination date, if any, link information, and group ID. The metadata information is typically static information about the asset. Each asset has its own unique metadata.

Each asset also has its own group ID to which it is related. For example, a movie trailer video belongs to its movie asset group. The group around a movie typically includes a movie audio, video file, movie video trailer, movie audio trailer, movie poster file, movie description file, and Video On Demand (VOD) font file. The asset management system of the invention not only tracks assets individually, because of the interconnections between registries and managers, tracks utilization and scheduling of each entire group of assets.

Further, many of the assets are periodically updated or revised such as is the case with news files. The configuration manager 108, utilizing each of its registries, and specifically the metadata registry 110 and the application information registry 112 provides the baseline for distribution of these updates to the system.

The usage manager 122 ensures that an optimal storage/space configuration is continually maintained based on actual asset usage. Referring now to FIG. 5, operation 140 of the usage manager 122 queries the asset metadata register 110 and then the resource manager 102 and the storage disk topology register 114 to ascertain how many times a particular asset has been accessed and during what times and from where. Then the usage manager 122 determines in operation 142 which assets have not been used in a given period, say the past two days. The period of "non-use" is configurable by asset type since viewing time windows for news, for example, could be measured in hours; whereas viewing of movies can be measured in weeks. In operation 144, the usage manager then compares these unused assets to a predetermined number of minimum copies(x) allowed for this asset. If the number of current unused copies exceeds the minimum allowed copies, then the usage manager queues the excess copies for deletion and transfers processing to the delete asset block 138 through the time manager 126 and resource manager 102.

In addition to removing unused assets, the usage manager can copy popular assets that do not currently have enough copies on any given system. The usage manager 122 queries, in block 146, if usage of any asset or asset group is above a predetermined y % above a predetermined minimum (x). If there are any assets or asset groups where usage is greater than y %, then the usage manager 122 queues these assets or asset groups for additional copying in the asset copy block 134 through the time manager 126 and the resource manager 102 (Note: y % may be a threshold level of bandwidth). However, first the assets identified for copying are compared for usage with each other in block 148 to determine which should be copied first. The assets are ordered by magnitude of the amount above the predetermined y % such that the largest are fed through time manager 126 and hence to the resource manager 102 to the asset copy block 134. The usage manager has, through this mechanism, ensures that the most used assets are copied first, keeping in mind that copying also utilizes bandwidth, to avoid assets being interpreted by a new viewer, i.e. the end user, as being "unavailable".

Turning now to FIG. 6, the bandwidth manager 124 manages the flow of assets through the various distribution channels or interfaces between nodes, between storage devices, to and from the WAN or LAN and to and from end users and servers via cable. Each transmission channel, such as cable or SCSI interface, has limitations based on time and volume. The bandwidth manager optimizes the flow of data through these channels. Operation 124A gets registry information containing bandwidth topology. Then operation 124B compares the bandwidth topology to the user. Operation 124C computes net available bandwidth, and operation 124D passes available bandwidth back to usage manager.

Turning now to FIG. 8, the weighting manager 128 is used to prioritize assets for copying or deletion by factors assigned to each asset by asset type. For example, the weighting manager obtains asset type and group information in block 154 from asset metadata register 110. Then the weighting factor registry provides the factor for the asset type, in block 156. Finally, the weighting factors assigned to the assets are used in block 158 to prioritize the copying or deletion of the assets. For example, a movie (and all its related assets) may be assigned a weighting factor of 1.0 and be considered the system's most "important" asset group, whereas posters may be assigned a weighting factor of 0.1 and therefore considered expendable in a time period of network contention for handling assets. Therefore the movie would be prioritized higher in block 158 for disposition than the poster. The results of this block 158 are provided to block 128 of the resource manager 102 for final ordering of asset copying or deletions fed to the media manipulation block 132.

While an exemplary preferred embodiment of the present invention is described herein with particularity, those having normal skill in the art will recognize that various changes, modifications, additions and applications other than those specifically mentioned herein may be made without departing from the spirit of this invention. The invention has been described by way of example an not by way of limitation. Accordingly, it is intended that all such modifications and alterations are within the scope of the invention as defined by the appended claims.

What is claimed is:

1. A media asset management system for scheduling utilization, distribution and storage of a media asset being provided to viewers over a media asset distribution network comprising:

a resource means for managing media asset traffic in the distribution network by managing the storage of a media asset, said media asset including metadata, and generating registry information for the media asset, said registry information indicating actual usage of the media asset;

schedule means responsive to said resource means for copying or deleting a media asset and the registry information associated with the media asset;

a usage means responsive to the registry information for generating asset availability information for a media asset based on said media asset metadata, a number of copies of the media asset, and actual usage of the media asset;

said resource means querying said usage means for asset availability information of a media asset and generating a copy instruction or a delete instruction for a media asset depending on the asset availability information;

said schedule means responsive to the copy instruction for copying the media asset and registry information associated with that media asset; and said schedule means responsive to the delete instruction for deleting a copy of the media asset and registry information associated with that copy of the media asset.

2. The system in accordance with claim 1 wherein a plurality of registers store the registry information indicating bandwidth topology, weighting factors and timing information for network components and media assets.

3. The system according to claim 2 wherein said resource means further comprises:

a bandwidth means for monitoring bandwidth topology and determining available unused bandwidth for transmission of an asset over the distribution network to a viewer.

4. The system according to claim 2 wherein said resource means further comprises:

weighting means for prioritizing media assets for copying and deleting in accordance with weighting factors in the registry information for the media assets.

5. The system according to claim 2 wherein said resource means further comprises:

timing means responsive to the timing information for prioritizing assets for copying and deleting in accordance with timing information from said registers.

6. In a media asset distribution system, a method for managing storage of a media asset at an operation center and distribution of the media asset over a distribution network from the operation center to end users, said media asset including asset specific metadata, said method comprising the steps of:

storing a copy of a media asset and said asset specific metadata, and generating registry information for each stored copy of the media asset, said registry information including actual usage of the media asset;

determining excess copies or not enough copies of a media asset based on a number of stored copies of the media asset, said asset specific metadata, and actual usage of the media asset;

in response to not enough copies of a media asset, determining from said asset specific metadata whether an additional copy of said media asset may be made and, if so, making and storing an additional copy of the media asset and the registry information for the additional copy of the media asset; and in response to excess copies of a media asset, deleting a copy of the media asset and registry information associated with that copy of the media asset.

7. The method of claim 6 wherein the registry information further comprises bandwidth topology, and said method further comprises the steps of:

comparing bandwidth topology choices for distribution of the media asset to end users;

computing net available bandwidth for distribution of the media asset to the end users; and said determining step responsive to said net available bandwidth in determining excess copies and not enough copies.

8. The method of claim 7 wherein the registry information further comprises asset type and timing information, and said method further comprises the step of:

prioritizing the copy order and deletion order of media assets in accordance with the timing information and the asset type.

9. The method of claim 8 wherein the registry information further comprises asset type and weighting factors for each asset type, and said method further comprises the step of:

prioritizing the copy order or deletion order of media assets based on the asset type of the media asset and the weighting factor for each asset type.

10. The method of claim 6 wherein the registry information further comprises asset type and timing information, and said method further comprises the step of:

prioritizing the copy order and deletion order of media assets in accordance with the timing information and the asset type.

11. The method of claim 6 wherein the registry information further comprises asset type and weighting factors for each asset type, and said method further comprises the step of:

prioritizing the copy order or deletion order of media assets based on the asset type of the media asset and the weighting factor for each asset type.

12. A media asset management system for scheduling utilization, distribution and storage of a media asset being provided to viewers over a media asset distribution network comprising:

a resource means for managing media asset traffic in the distribution network by managing the storage of a media asset, said media asset including metadata providing at least a permissible number of copies available on predetermined dates, and generating registry information for the media asset, said registry information indicating actual usage of the media asset;

schedule means responsive to said resource means for copying or deleting a media asset and the registry information associated with the media asset according to said predetermined dates;

a usage means responsive to the registry information for generating asset availability information for a media asset based on said media asset metadata, a number of copies of the media asset, and usage of the media asset;

said resource means querying said usage means for asset availability information of a media asset and generating an add copy instruction or delete copy instruction for a media asset depending on the asset availability information;

said schedule means responsive to the add copy instruction for copying the media asset and registry information associated with that copy of the media asset; and said schedule means responsive to the delete copy instruction for deleting a copy of the media asset and registry information associated with that copy of the media asset.

13. In a media asset distribution system, a method for managing storage of a media asset at an operation center and distribution of the media asset over a distribution network from the operation center to end users, said method comprising the steps of:

storing a copy of a media asset including asset specific metadata providing number of permissible copy information, and generating registry information for each stored copy of the media asset, wherein said registry information includes actual usage of the media asset;

determining excess copies or not enough copies of a media asset based on a number of stored copies of the media asset, said asset specific metadata, and actual usage of the media asset on said network;

determining from said asset specific metadata, in response to not enough copies of a media asset, whether an additional copy of said media asset may be made and, if so, making and storing an additional copy of the media asset and the registry information for the additional copy of the media asset; and in response to excess copies of a media asset, deleting a copy of the media asset and updating the registry information associated with that copy of the media asset.

* * * * *